(12) United States Patent
Carlucci et al.

(10) Patent No.: US 8,151,294 B2
(45) Date of Patent: Apr. 3, 2012

(54) TECHNIQUE FOR DELIVERING ENTERTAINMENT PROGRAMMING CONTENT INCLUDING COMMERCIAL CONTENT THEREIN OVER A COMMUNICATIONS NETWORK

(75) Inventors: John Carlucci, Boulder, CO (US); William Helms, Longmont, CO (US)

(73) Assignees: Time Warner Cable LLC, New York, NY (US); Time Warner Entertainment Company, L.P., New York, NY (US)

( * ) Notice: Subject to any disclaimer, the term of this patent is extended or adjusted under 35 U.S.C. 154(b) by 0 days.

(21) Appl. No.: 12/777,072

(22) Filed: May 10, 2010

(65) Prior Publication Data
US 2010/0251288 A1 Sep. 30, 2010

Related U.S. Application Data

(63) Continuation of application No. 10/303,290, filed on Nov. 25, 2002, now Pat. No. 7,716,700.

(51) Int. Cl.
*H04N 7/10* (2006.01)
*H04N 7/025* (2006.01)
*H04N 7/173* (2011.01)
*G06F 3/00* (2006.01)

(52) U.S. Cl. ............ 725/32; 725/36; 725/105; 725/114; 725/115; 725/116; 715/723

(58) Field of Classification Search .................... 725/32, 725/36, 91, 92, 93, 94, 105, 114, 115, 116; 715/723, 725
See application file for complete search history.

(56) References Cited

U.S. PATENT DOCUMENTS

| | | | | |
|---|---|---|---|---|
| 2002/0144262 | A1* | 10/2002 | Plotnick et al. | 725/32 |
| 2004/0034874 | A1* | 2/2004 | Hord et al. | 725/136 |
| 2004/0205829 | A1* | 10/2004 | Hane, III. | 725/135 |

* cited by examiner

*Primary Examiner* — Kristine Kincaid
*Assistant Examiner* — John Schnurr
(74) *Attorney, Agent, or Firm* — Straub & Pokotylo; Michael P. Straub; Stephen T. Straub (57) ABSTRACT

Although personal video recorders (also known as digital video recorders) provide certain conveniences to viewers of programming content, such devices facilitate manipulation or Askipping@ of commercials, frustrating the intent of the advertisers of the commercials. In accordance with the invention, when a user fast-forwards (rewinds) a commercial, alternate commercial(s) may be accessed for display in place of the original commercial, which provides a full impression of the goods and service promoted, otherwise impossible to appreciate at the fast-forward (rewind) speed. The duration of the alternate commercial(s) corresponds to the duration of the original commercial at the fast-forward (rewind) speed controlled by the user. With the invention, the user advantageously realizes the convenience of manipulating programming content, and at the same time can appreciate the full impression of an alternate commercial to the original commercial, albeit in a shorter duration.

15 Claims, 7 Drawing Sheets

| COMMERCIAL 221a BEGINNING I-FRAME: $I_{1003}$ ENDING I-FRAME: $I_{2501}$ |||
|---|---|---|
| SPEED (DURATION) | FAST-FORWARD | REWIND |
| 10X (3 sec.) | A1 | B1 |
| 6X (5 sec.) | A2 | B2 |
| 3X (10 sec.) | A3 | B3 |
| 2X (15 sec.) | A4 | B4 |

TECHNIQUE FOR DELIVERING ENTERTAINMENT PROGRAMMING CONTENT INCLUDING COMMERCIAL CONTENT THEREIN OVER A COMMUNICATIONS NETWORK

RELATED APPLICATIONS

The present application is a continuation of U.S. patent application Ser. No. 10/303,290 filed Nov. 25, 2002 now U.S. Pat. No. 7,716,700 which is hereby expressly incorporated by reference in its entirety.

FIELD OF THE INVENTION

The invention relates to communications systems and methods, and more particularly to a system and method for delivering entertainment programs having commercials therein through a communications network, e.g., a cable TV network.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among others, the methodologies for video and audio data compressions which allow multiple programs, with different video and audio feeds, multiplexed in a transport stream traversing a single transmission channel. A digital TV receiver may be used to decode an MPEG-2 encoded transport stream, and extract the desired program therefrom.

MPEG-2 Background

In accordance with the MPEG-2 standard, video data may be compressed based on a sequence of groups of pictures (GOPs), made up of three types of picture frames—intra-coded picture frames ("I-frames"), forward predictive frames ("P-frames") and bilinear frames ("B-frames"). Each GOP may, for example, begin with an I-frame which is obtained by spatially compressing a complete picture using discrete cosine transform (DCT). As a result, if an error or a channel switch occurs, it is possible to resume correct decoding at the next I-frame.

The GOP may represent additional frames by providing a much smaller block of digital data that indicates how small portions of the I-frame, referred to as macroblocks, move over time.

An I-frame is typically followed by multiple P- and B-frames in a GOP. Thus, for example, a P-frame occurs more frequently than an I-frame by a ratio of about 3 to 1. A P-frame is forward predictive and is encoded from the I- or P-frame that precedes it. A P-frame contains the difference between a current frame and the previous I- or P-frame.

A B-frame compares both the preceding and subsequent I- or P-frame data. The B-frame contains the average of matching macroblocks or motion vectors. Because a B-frame is encoded based upon both preceding and subsequent frame data, it effectively stores motion information.

Thus, MPEG-2 achieves its compression by assuming that only small portions of an image change over time, making the representation of these additional frames extremely compact.

Although GOPs have no relationship between themselves, the frames within a GOP have a specific relationship which builds off the initial I-frame.

The compressed video and audio data are carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption) and this information is also carried in the MPEG-2 transport stream, possibly as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Use of personal video recorders (PVRs), also known as digital video recorder (DVRs), such as TiVo and ReplayTV devices, provide conveniences to viewers of television programming. For example, if a PVR user is watching an in-progress broadcast program, the user may rewind the recorded portion of the program to a certain point that has already been broadcast or may pause for subsequent playing, rewinding and/or fast-forwarding. Similarly, for programming that has already been broadcast and recorded, the user may also apply any of these PVR functions.

The cable TV industry has been fervently pursuing a "network PVR (NPVR)" approach allowing the user to perform the analogous PVR functions through use of a network, rather than a local PVR device. In fact, a network architecture and functionalities for implementing such an NPVR approach have been developed and are described, e.g., in copending commonly assigned application Ser. No. 10/263,015, filed on Oct. 2, 2002, hereby incorporated by reference.

In some instances, however, the aforementioned PVR functions may have an adverse effect on advertisers. For instance, if a PVR user decides to rewind or fast-forward past a commercial, the user would hardly realize the impression of the commercial at a high rewind or fast-forward speed, and thus appreciate its effect intended by the advertiser.

SUMMARY OF THE INVENTION

The invention overcomes the prior art limitations by use of one or more alternate commercials for substituting the original commercial in programming content when a user performs a PVR-like function (e.g., fast-forward, rewind and pause) on a presentation of the programming content. In accordance with the invention, access to the one or more alternate commercials is provided. When a request for manipulation of the presentation (e.g., fast-forwarding, rewind and pausing) of the programming content is received, which includes information concerning a manipulation speed affecting the presentation, at least one of the commercials (original or alternate) is selected for presentation as a function of the manipulation speed.

The one or more alternate commercials are in different lengths, and correspond to different manipulation speeds selectable by the user. The length of the selected alternate commercial(s) corresponds to the length of the original commercial played at the manipulation speed. The selected alternate commercials(s) replacing the original commercial may comprise a video, a series of slides, a still image, etc. for providing a full impression of the goods or service promoted, which the original commercial fails to provide at the manipulation speed.

BRIEF DESCRIPTION OF THE DRAWING

Further objects, features and advantages of the invention will become apparent from the following detailed description taken in conjunction with the accompanying drawing showing illustrative embodiments of the invention, in which.

DETAILED DESCRIPTION

The invention is directed to delivering programming content, including commercials therein, to users through a broadband communications network, e.g., a cable TV network. The programming content may comprise a broadcast program, e.g., a TV show, which is interrupted by commercials. In an embodiment of the invention, a user at a set-top terminal may issue commands to perform PVR-like functions (e.g., fast-forward, rewind, and pause) on the TV show received from the cable TV network. In addition, the user may control variable speeds of fast-forwarding and rewinding the show, e.g., 2 times (2×) and 10 times (10×) the normal playing speed. Like a PVR user, the user here may take advantage of the PVR-like functions to try to fast-forward or rewind commercials while he/she is reviewing the TV show. However, in accordance with the invention, when the user fast-forwards or rewinds the TV show including a commercial at a selected speed, the commercial is replaced with an alternate impression thereof suitable for that speed, e.g., a sequence of still frames comprising a slide presentation.

Figure 1:
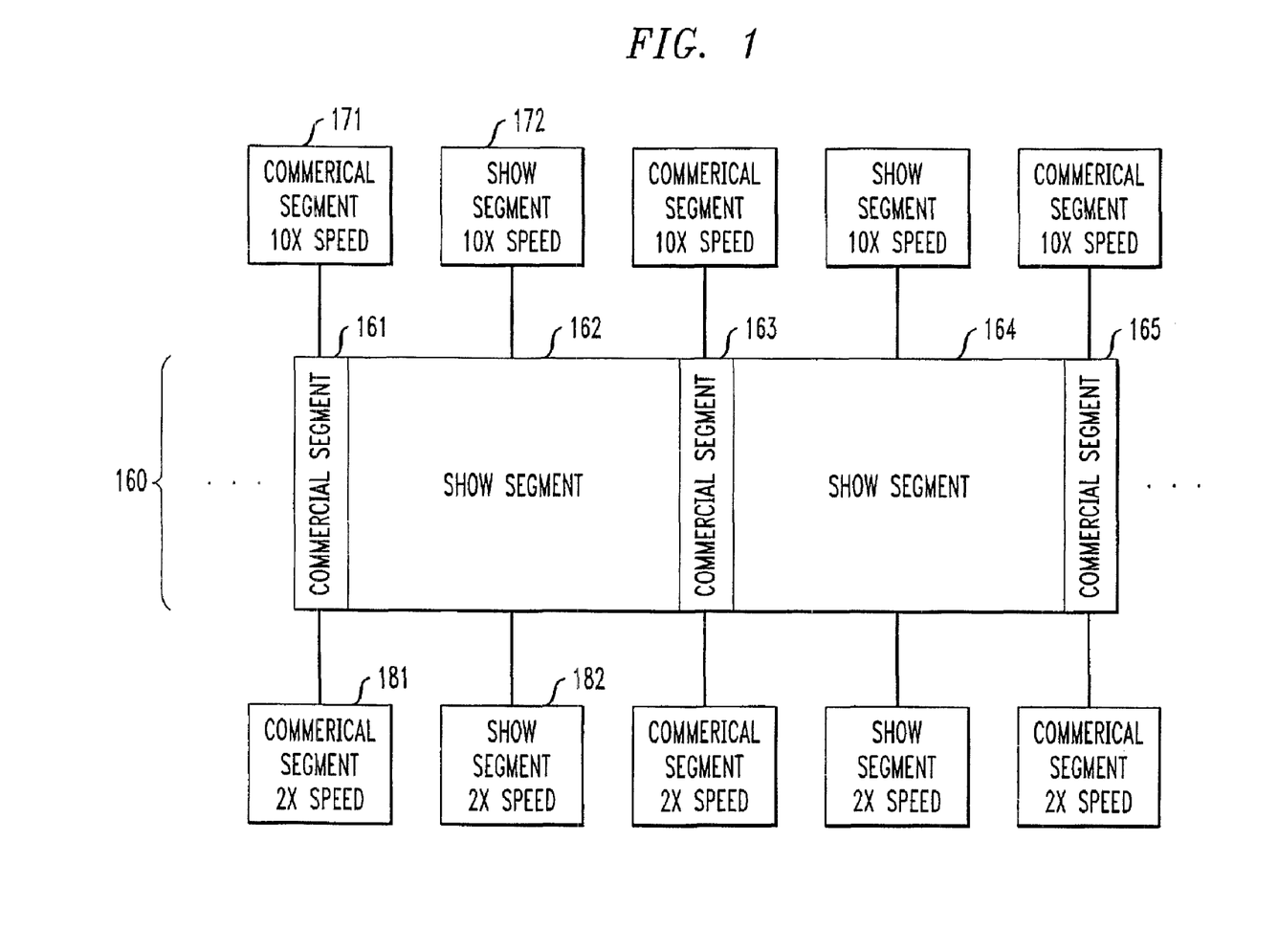
FIG. 1 illustrates a tree structure demonstrating a Aplay list@ concept in accordance with the invention.

The invention is predicated upon a Aplay list@ concept which FIG. 1 illustrates using a simple tree structure. For example, trunk section 160 of the tree represents a TV show which includes commercial segments (e.g., 161, 163 and 165) and TV show segments (e.g., 162 and 164) and progresses at a normal play speed. Branches (e.g., 171 and 181) extend from each segment (e.g., 161) of trunk 160, which represent the content replacing the segment at alternative, fast-forwarding or rewinding speeds. The number of branches extending from each trunk segment correspond to the number of alternative speeds, which illustratively are 2× and 10× normal speed in this instance. In other words, the tree structure of FIG. 1 represents a play list, based on which programming content is shown to a user depending on the actual play speed chosen by the user. Thus, in accordance with the invention, if the user chooses to fast-forward (or rewind) a commercial in segment 161 at a 2× the normal speed, an alternate impression of the commercial suitable to that speed, represented by branch 181, is shown to the user, instead. On the other hand, if the user chooses to fast-forward (or rewind) the same commercial at 10× the normal speed, a second alternate impression of the commercial suitable to that speed, represented by branch 171, is shown to the user, instead. Similarly, if the user chooses to fast-forward (or rewind) show segment 162 at the 2× speed, a fast-forward (or rewind) trick file corresponding to that speed, represented by branch 172, is played to the user, instead, to achieve the desired fast-forward (or rewind) effect. On the other hand, if the user chooses to fast-forward (or rewind) the same show segment at the 10× speed, a fast-forward (or rewind) trick file corresponding to that speed, represented by branch 182, is played to the user, instead, to achieve the desired fast-forward (or rewind) effect.

Figure 2:
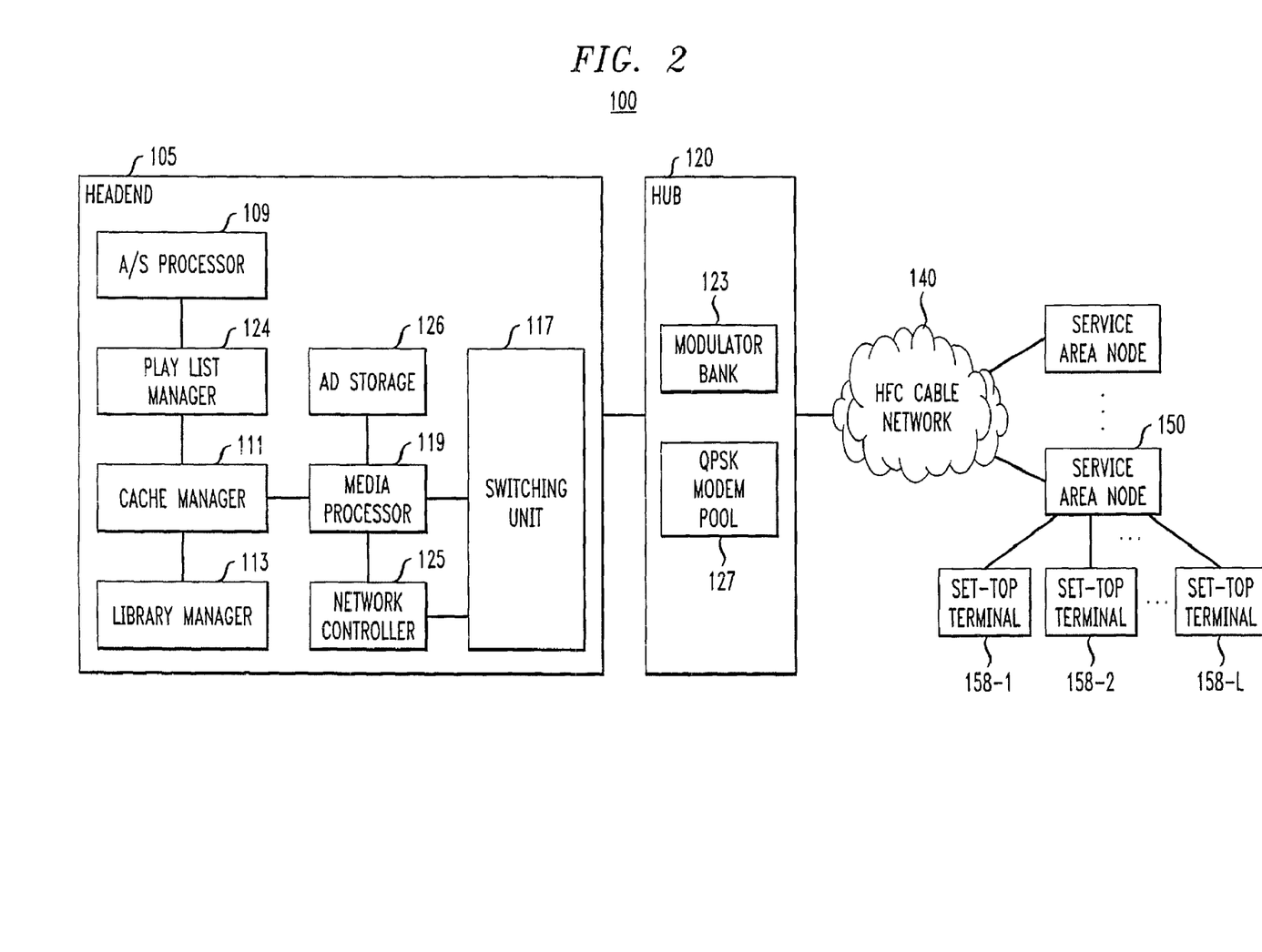
FIG. 2 is a block diagram of a broadband communications system in accordance with the invention.

FIG. 2 illustrates broadband communications system 100 for providing interactive programming and services to users, which implements the inventive Aplay list@ concept described above. In particular, system 100 provides a user with PVR-like functions to manipulate programming content being reviewed, and with an alternate commercial to an original commercial when the user rewinds or fast-forwards, or otherwise manipulates the original commercial, in accordance with the invention. In this illustrative embodiment, system 100 includes a cable system for delivering information and entertainment programs (including TV shows, movies, etc.) to set-top terminals on the user premises. As shown in FIG. 2, system 100 includes headend 105, hub 120, hybrid fiber coax (HFC) cable network 140 and different service area nodes including node 150, which in this instance is connected to set-top terminals 158-1 through 158-L in a neighborhood, where L represents an integer.

Headend 105 receives programs and services from various providers and sources, e.g., analog and digital satellite sources, application servers, media servers, the Internet, etc. Analog and digital satellite sources typically provide the traditional forms of television broadcast programs and information services. Application servers typically provide executable code and data for application specific services such as database services, network management services, transactional electronic commerce services, system administration console services, application specific services (such as stock ticker, sports ticker, weather and interactive program guide data), resource management service, connection management services, subscriber cares services, billing services, operation system services, and object management services. Media servers provide time-critical media assets such as MPEG-2 encoded video and audio, MPEG-2 encoded still images, bit-mapped graphic images, PCM digital audio, three dimensional graphic objects, application programs, application data files, etc. Although specific examples of programs and services which may be provided by the aforementioned sources are given herein, other programs and services may also be provided by these or other sources without departing from the spirit and scope of the invention.

Acquisition/Staging (A/S) processor 109 in headend 105 processes program materials including, e.g., TV program streams, from one or more of the aforementioned sources in analog and digital forms. Analog TV program streams may be formatted according to the National Television Standards Committee (NTSC) or Phase Alternating Line (PAL) broadcast standard. Digital TV streams may be formatted according to the Digital Video Broadcasting (DVB), Society of Cable Telecommunications Engineers (SCTE), or Advanced Television Systems Committee (ATSC) standards. Processor 109, among other things, extracts program content in the analog and digital TV streams and reformats the content to form one or more MPEG-2 encoded transport streams. Such reformatting may even be applied to those received streams already in an MPEG-2 format. This stems from the fact that the digital content in the received MPEG-2 streams may be encoded at a variable bit rate (VBR). To avoid data burstiness, processor 109 may in a conventional manner re-encode such digital content at a constant bit rate (CBR) to form the aforementioned transport streams. Encoding digital content at a CBR may also eliminate the need for otherwise complex data rate-shaping or re-quantization downstream.

An MPEG-2 transport stream contains multiple programs with different video and audio elementary streams multiplexed for transmission through the same transmission channel. The programs are identified by respective program identifications (IDs) within a transport stream. It should be noted at this point that the term Atransmission channel@ should not be confused with a Aprogram channel.@ A Atransmission channel@ signifies a designated frequency band through which a transport stream is transmitted. On the other hand, a Aprogram channel@ signifies the source of the program material selected by a user to view. For example, a user may select program channel 2 to view program material provided by CBS, program channel 14 to view program material provided by ESPN; program channel 32 to view program material provided by MTV, etc.

In this illustrative embodiment, the transmission channels, each carrying a transport stream, may be 6 MHz bands populating a forward passband, e.g., 350-750 MHz band, of a coaxial cable, which is allocated for downstream communication from headend 105 to a set-top terminal.

A/S processor 109 may receive Aassets@ including prestaged movie videos, commercials, news reports, sports events, etc. from content providers. However, processor 109 may also create Aassets@ in real time while processing received program materials which are not pre-staged by the content providers. In general, an Aasset@ is a container for any object or set of objects that may be desired to implement a program, service, including video, audio, images, application executables, scripts, configuration files, text, fonts, and HTML pages. In addition to the raw content, metadata is also a part of an asset object that describes characteristics of the asset. For example, asset metadata may describe attributes that are inherent in the content of the asset, such as the rating, format, duration, size, or encoding method. Values for asset metadata are determined at the time the asset is created. In this illustrative embodiment, an asset concerning a program may include a metadata file and trick files associated with the program (described below), in addition to the program content contained in a transport stream. An asset concerning a commercial may include a metadata file and commercial branch table associated with the commercial (described below), in addition to the commercial content contained in a transport stream.

Figure 3:
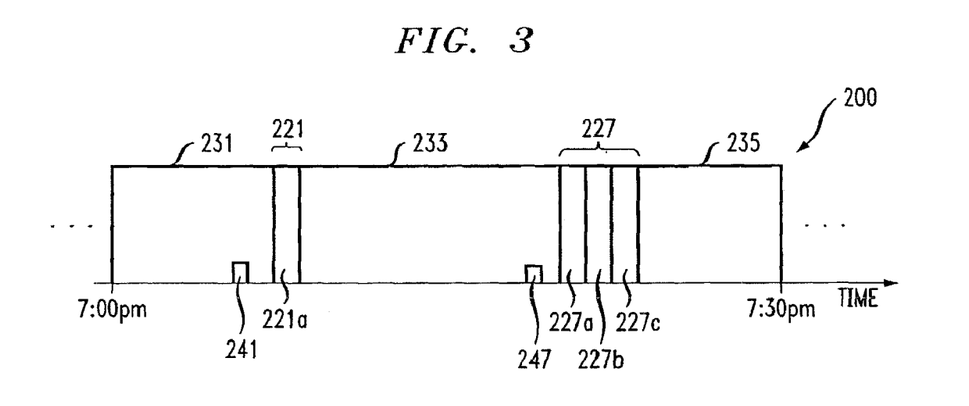
FIG. 3 illustrates a TV program comprising multiple program segments which is provided in the system of FIG. 2.

FIG. 3 illustrates TV program 200 which spans from 7:00 p.m. to 7:30 p.m. Program 200 comprises a show interrupted by commercials, which is typical. Thus, the program content in this instance consists of show segments 231, 233 and 235, interleaved with commercial segments 221 and 227. Without loss of generality, commercial segment 221 comprises commercial 221a whereas commercial segment 227 comprises commercials 227a, 227b and 227c in this example.

In accordance with an aspect of the invention, the TV streams received by processor 109 are pre-processed, e.g., by the providers, to include delimiting messages, on which processor 109 relies to identify the demarcations (or edges) of different programs and program segments within each program. Thus, in this instance, before processor 109 processes the TV stream containing TV program 200, a first delimiting message is inserted at the beginning of segment 231, indicating the beginning of TV program 200; second delimiting messages are inserted at the beginnings of segments 221 and 227, indicating the beginnings of the respective commercial segments; third delimiting messages are inserted at the ends of segments 221 and 227, indicating the ends of the respective commercial breaks; and a fourth delimiting message is inserted at the end of segment 235, indicating the end of TV program 200.

In this illustrative embodiment, the TV streams received by processor 109 are also pre-processed to include digital cue messages. Each digital cue message is associated with an upcoming commercial segment, and contains information concerning, e.g., the identities of the commercials appearing in the upcoming commercial segment, the duration of each commercial, identifiers of the beginning I-frame and last I-frame of each commercial (which is MPEG-2 encoded), etc. The commercials may be identified by different codes, respectively, and the commercial duration is typically 30 seconds long. For example, digital cue message 241 (247) is provided in advance of associated commercial segment 221 (227) by a predetermined period, e.g., six seconds in this instance. In response to digital cue message 241 (247), for each of approaching commercials 221a (227a, 227b and 227c), manager 124 generates a commercial branch table in anticipation of a user=s manipulating (e.g., fast-forwarding and rewinding) the commercial, to implement the above-described Aplay list@ concept.

Figure 4:
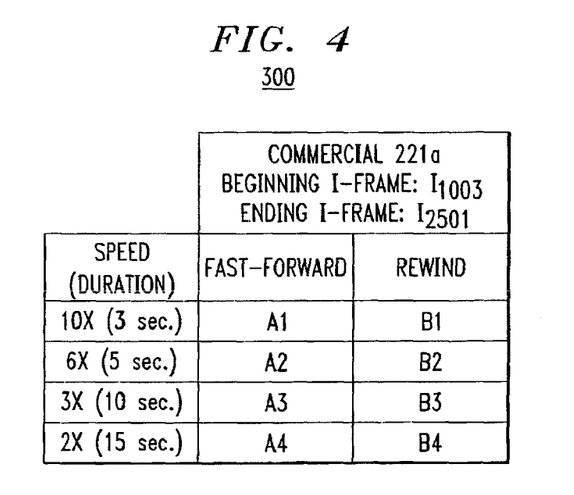
FIG. 4 illustrates a commercial branch table implementing the Aplay list@ concept.

FIG. 4 illustrates commercial branch table 300 corresponding to commercial 221a which is generated by manager 124 based on the information in digital cue message 241. In generating table 300, manager 124 looks up alternate commercials to original commercial 221a from an advertising table (not shown) stored in manager 124 or other location. In the advertising table, for each original commercial identified by its code, alternate commercials to the original commercial are listed in association therewith and identified by their respective codes. These alternate commercials correspond to different fast-forward and rewind speeds (e.g., 2×, 3×, 6× and 10× the normal play speed in this instance), or durations thereof in forward and reverse play directions. In accordance with the invention, an alternate commercial is played in lieu of the original commercial depending on the actual play speed or the allowed commercial duration resulting from such a play speed.

For example, in anticipation of the user=s fast-forwarding (rewinding) original commercial 221a (e.g., 30 seconds long) at 2× the normal play speed, which would normally render commercial 221a unintelligible as in prior art, one of the alternate commercials here may be a 30/2=15 second commercial substitute for commercial 221a at the 2× speed to give the otherwise impossible full impression of the goods or service promoted, albeit with a shorter time allotment (i.e., 15 seconds vs. originally 30 seconds). Another alternate commercial may be a 30/3=10 second commercial substitute for commercial 221a at a 3× speed. Yet another alternate commercial may be a 30/6=5 second commercial substitute for commercial 221a at a 6× speed. Still yet another alternate commercial may be a 30/10=3 second commercial substitute for commercial 221a at a 10× speed. For example, the 15 and 10 second alternate commercials may comprise videos in the corresponding lengths promoting the goods or service in question; the 5 second alternate commercial may comprise a number of slides promoting the goods or service in question; and the 3 second alternate commercial may comprise a still image (e.g., a logo) representing the goods or service in question.

As shown in FIG. 4, manager 124 populates in column 321a of commercial branch table 300 codes A1, A2, A3 and A4 identifying alternate commercials to commercial 221a which correspond to the 10×, 6×, 3× and 2× fast-forward speeds (or 3 second, 5 second, 10 second and 15 second durations in the forward play direction), respectively; and in column 321b codes B1, B2, B3 and B4 identifying alternate commercials to commercial 221a which correspond to the 10×, 6×, 3× and 2× rewind speeds (or 3 second, 5 second, 10 second and 15 second durations in the reverse play direction), respectively. It suffices to know for now that the actual alternate commercial content identified by codes A1, A2, A3, A4, B1, B2, B3 and B4 are stored in advertisement (Ad) storage 126, which are also MPEG-2 encoded. Storage 126 has a memory capacity on the order of, say, terabytes to adequately store the video, slide shows and/or still images that make up the array of alternate commercials. Manager 124 also populates in row 321 of table 300 the identifiers of the beginning I-frame (e.g., $I_{1003}$) and ending I-frame of commercial 221a (e.g., $I_{2501}$), which information is obtained from digital cue message 241. Table 300 is made part of the asset concerning commercial 221a, and stored in association with commercial 221a in asset storage (not shown), which may reside in library manager 113 described below.

Processor 109 creates in real time trick files associated with show segment 231 (233, 235) as part of its asset which are used to perform PVR-like functions (e.g., fast-forwarding and rewinding) on show segment 231 (233, 235), in accordance with the above-described Aplay list@ concept. In general, for each fast-forward play speed, a Afastforward@ trick file is provisioned, which contains an array of identifiers of I-frames in the program stream (MPEG-2 encoded as mentioned before) corresponding to show segment 231 (233, 235) in a forward play direction. Another trick file is a Arewind@ trick file which contains an array of identifiers of I-frames in the program stream corresponding to show segment 231 (233, 235) in the reverse play direction. The I-frame identifiers in the trick files are used as indices or markers for rewinding and fast-forwarding of show segment 231 (233, 235). It should be noted that not all of the I-frames associated with show segment 231 (233, 235) are selected for the trick files. Rather, the I-frames are selected periodically along the program stream corresponding to show segment 231 (233, 235). Thus, the shorter the period is, the closer the instants from which program 200 can be rewound, and to which program 200 can be fast-forwarded, thereby achieving finer adjustments.

For example, the fast-forward (rewind) trick files for a 2× play speed in this instance contain identifiers of the I-frames associated with show segment 231 (233, 235) which are selected at a period P in the forward (reverse) play direction; the fast-forward (rewind) trick files for a 3× play speed in this instance contain identifiers of the I-frames selected at a period of 3/2=1.5 P in the forward (reverse) play direction; the fast-forward (rewind) trick files for a 6× play speed in this instance contain identifiers of the I-frames selected at a period of 6/2=3 P in the forward (reverse) play direction; and the fast-forward (rewind) trick files for a 10× play speed in this instance contain identifiers of the I-frames selected at a period of 10/2=5 P in the forward (reverse) play direction. The resulting trick files are made part of the asset concerning show segment 231 (233, 235), and stored in association with show segment 231 (233, 235) in the aforementioned asset storage.

In another embodiment, the actual trick files are not stored. Rather, the period P is stored in association with show segment 231 (233, 235). Depending on the actual play speed selected by a user, media processor 119 (described below) reads the I-frames associated with show segment 231 (233, 235) at an appropriate period to achieve the play speed effect. Specifically, the I-frames are read in a forward (reverse) play direction at a period P to achieve a 2× fast-forward (rewind) speed effect; they are read in a forward (reverse) play direction at a period 1.5 P to achieve a 3× fast-forward (rewind) speed effect; they are read in a forward (reverse) play direction at a period 3 P to achieve a 6× fast-forward (rewind) speed effect; and they are read in a forward (reverse) play direction at a period 5 P to achieve a 10× fast-forward (rewind) speed effect.

The transport streams generated by processor 109, which contain live TV programs in this instance, are fed to cache manager 111 through play list manager 124. Manager 111 includes a cache memory (not shown), e.g., a disk cache, having a memory capacity on the order of terabytes. Manager 111 copies the transport streams onto the cache memory, and also forwards the same to library manager 113 for long-term storage. The latter includes library storage having a memory capacity on the order of hundreds of terabytes, much larger than that of the cache memory such that the cache memory stores the last Y hours=worth of the TV programs while the library storage stores the last Z hours=worth of the TV program, where the value of Z is much greater than that of Y. It suffices to know for now that use of the cache memory, which affords faster access to its content than the library storage, facilitates a speedy retrieval of a requested program in the event of a Acache hit,@ i.e., the requested program being within the last Y hour broadcast. Otherwise, a Acache miss@ causes locating the requested program in the library storage, thereby incurring a delay in the retrieval of the program.

Network controller 125, among others, assigns resources for transporting program materials to set-top terminals and communicates various data including system information with the terminals. Upstream data from a set-top terminal to network controller 125 is communicated via a reverse passband, e.g., 5-40 MHz band, of a coaxial cable. The reverse passband may comprise reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths therefor depending on the actual implementations. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. It should be noted that a Data Over Cable Service Interface Specification (DOCSIS), another industry standard, may be used to specify the data format of an upstream message, and the method of, and equipment used in, the upstream transmission as well.

As also specified by DAVIC, for communications purposes, the set-top terminals and network controller 125 are identified by the Internet protocol (IP) addresses assigned thereto. However, these IP addresses may be randomly assigned each time when system 100 is reconfigured. As a result, the IP address of a set-top terminal or controller 125 may change after a system reconfiguration. Nevertheless, each set-top terminal and controller 125 is also assigned a media access control (MAC) address on a permanent basis, surviving any system reconfiguration.

Downstream data from network controller 125 to a set-top terminal is communicated via forward data channels (FDCs). These channels, often referred to as Aout-of-band@ channels, may occupy the 70-130 MHz band of a coaxial cable. QPSK signals containing system messages to a set-top terminal are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths therefor depending on the actual implementations.

When a user at a set-top terminal, say, terminal 158-1, turns on the TV associated therewith and selects a particular program channel, say, program channel 2, or change from another channel to channel 2, terminal 158-1 in a well known manner scans for any transport streams transporting programs to the neighborhood. In system 100, each transport stream is identified by a unique transport stream identification (TSID).

Figure 5:
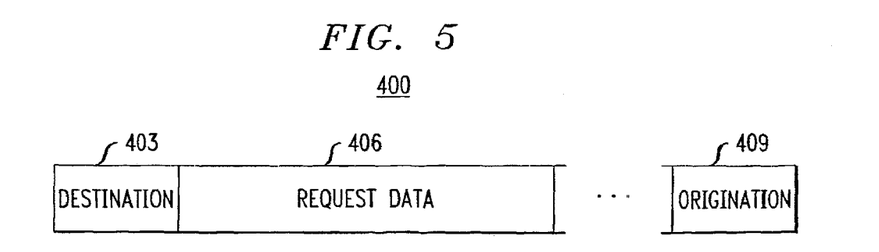
FIG. 5 illustrates a request for program material from a set-top terminal in the system of FIG. 2.

Continuing the above example, once the TSIDs of the transport streams are detected, terminal 158-1 sends through QPSK modem pool 127 a request for program channel 2 material. FIG. 5 illustrates one such request (denoted 400) sent from a set-top terminal to network controller 125 via an RDC. As shown in FIG. 5, request 400 includes, among others, destination field 403 which in this instance contains the IP address of network controller 125 for which request 400 is destined; request data field 406 which contains data concerning the detected TSIDs and the requested program channel material, e.g., program channel 2 material in this instance; and origination field 409 which in this instance contains the IP (and/or MAC) address of terminal 158-1 from which request 400 originates.

Figure 6:
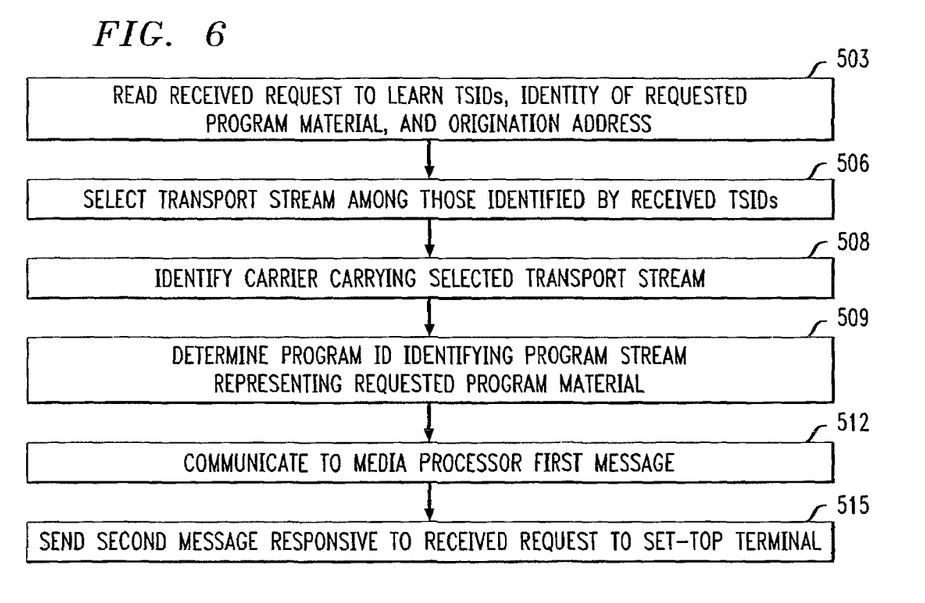
FIG. 6 is a flow chart depicting a process for providing program material in response to the request of FIG. 5.

After receiving request 400, network controller 125 reads the received request to learn the TSIDs, the identity of the requested program material, and the origination address therein, as indicated at step 503 in FIG. 6. Network controller 125 communicates with media processor 119 to determine the capacity required for transmitting the requested program material. Based on the required capacity, controller 125 at step 506 selects a transport stream among those identified by the received TSIDs which is suitable for transporting the requested program material. Controller 125 at step 508 identifies the carrier carrying the selected transport stream.

Figure 7:
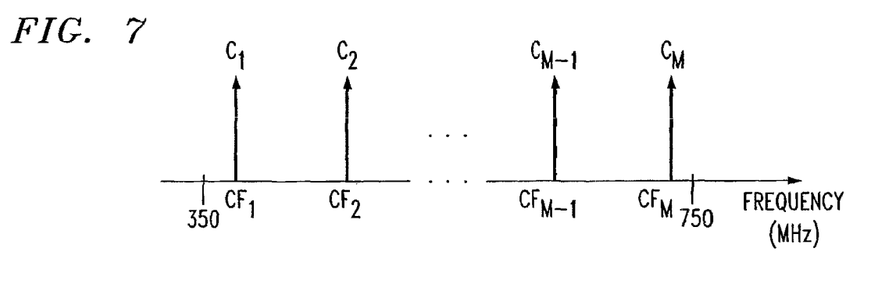
FIG. 7 illustrates selected carriers for transmitting program materials in a forward passband of the system of FIG. 2.

Referring also to FIG. 2, modulator bank 123 in this instance is located in hub 120 connected to headend 105 via IP transport on the one hand and to HFC cable network 140 on the other hand. Bank 123 includes multiple modulators, each of which is used to modulate transport streams onto different carriers. Each modulated carrier carrying a transport stream is transmitted through a transmission channel associated therewith. FIG. 7 illustrates M carriers, $C_1$ through $C_M$, associated with M transmission channels in the forward passband. As shown in FIG. 7, the carrier frequency of $C_1$ is denoted $CF_1$; the carrier frequency of $C_2$ is denoted $CF_2$; . . . ; and the carrier frequency of $C_M$ is denoted $CF_M$. In this example, each program stream may contain 4.2 Mb/s video and audio program data. By using a 256-quadrature-amplitude-modulation (256-QAM) technique and 6 MHz transmission channel, each modulator in modulator bank 123 in this instance may modulate up to 9 program streams, multiplexed in a transport stream, onto the corresponding carrier. The resulting modulated carrier is transmitted through the transmission channel associated with the carrier. Network controller 125 may include therein a carrier assignment table which lists, for each carrier, the TSID of the transport stream carried thereby. The carrier identification by network controller 125 at aforementioned step 508 may be achieved by looking up from the table the carrier associated with the TSID of the selected transport stream. Based on the requested program channel, network controller 125 at step 509 determines the program ID identifying the program stream representing the requested program material, i.e., program channel 2 material in this instance, which is then multiplexed with other program streams in the selected transport stream. At step 512, network controller 125 communicates to media processor 119 a first message containing the identity of the modulator in modulator bank 123 which corresponds to the carrier, say, $C_1$, just determined, and the program ID associated with the requested program channel material just determined. Network controller 125 at step 515 sends, through QPSK modem pool 127, a second message responsive to the received request to set-top terminal 158-1 identified by the origination IP (and/or MAC) address in field 409 of request 400. This second message traversing an FDC contains the information concerning the carrier frequency, i.e., $CF_1$ in this instance, to which terminal 158-1 should tune to receive the appropriate transport stream, and the program ID for extracting the desired program stream, representing in this instance program channel 2 material, within the transport stream.

In response to the first message, processor 119 directs cache manager 111 to deliver a copy of the program stream representing the requested program channel material thereto and causes the program stream to be multiplexed with any other program streams already in the transport stream identified by the selected TSID. In addition, processor 119 causes switching unit 117 to switch the resulting transport stream to the modulator corresponding to the carrier $C_1$. Accordingly, the modulator modulates the carrier $C_1$ with the received transport stream, and causes transmission of the modulated carrier through the transmission channel associated with $CF_1$.

Based on the information in the second message, terminal 158-1 tunes to the carrier frequency $CF_1$ to receive the transmitted transport stream, and extracts therefrom the desired program stream, representing program channel 2 material in this instance. In a well known manner, terminal 158-1 converts the extracted program stream to appropriate signals for the associated TV to play program channel 2 material.

While the program channel 2 material is being played, terminal 158-1 continuously registers the last I-frame identifier in the received transport stream. From time to time, terminal 158-1 sends a Aheartbeat@ containing the IP (and/or MAC) address identifying terminal 158-1 and the last I-frame identifier to media processor 119. Processor 119 keeps, for terminal 158-1, a record identified by the IP (and/or MAC) address of terminal 158-1, and tracks the program being transmitted to terminal 158-1 and its I-frame progress. When processor 119 no longer receives heartbeats from terminal 158-1, e.g., because of an off state of the terminal, processor 119 may cause the transmission of the transport stream to terminal 158-1 to be halted.

When the user issues a pause command to terminal 158-1, e.g., by pressing a Apause@ key on a remote control associated therewith to temporarily stop the progress of the program, terminal 158-1 issues a pause message to media processor 119 identified by its IP address. The pause message in this instance includes a pause initiation command, the last I-frame identifier registered by terminal 158-1, and the IP and/or MAC address of terminal 158-1. After issuing the pause message, terminal 158-1 enters a pause state and causes the picture corresponding to the next I-frame, say I-frame$_{pause}$, to be frozen on the TV screen, thereby achieving the pause effect. After receiving the pause message, processor 119 reads the received pause message, as indicated at step 803 in FIG. 8. Processor 119 at step 806 causes the current transmission of the program material to set-top terminal 158-1 (identified by the received IP and/or MAC address) to be halted at the I-frame immediately following the last I-frame identified in the received message. Processor 119 at step 809 retrieves the record associated with terminal 158-1. Processor 119 at step 812 notes in the record that the transmission of the program material to terminal 158-1 has been halted at I-frame$_{pause}$.

Figure 8:
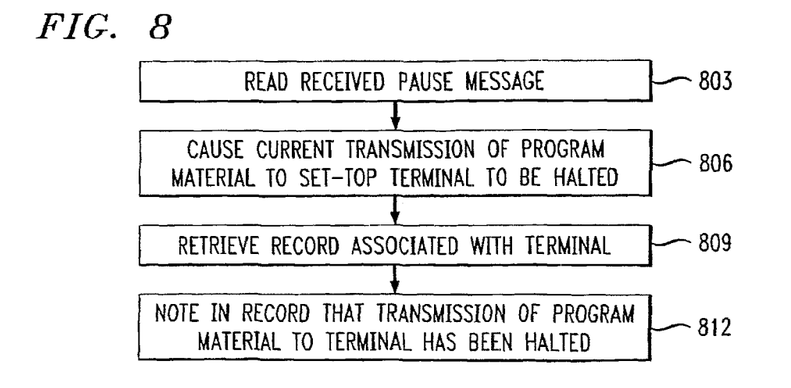
FIG. 8 is a flow chart depicting a process for pausing a program in response to a pause message from a set-top terminal.

When the user issues a command to resume viewing the program material, e.g., by toggling the pause key on the remote control, terminal 158-1 exits the pause state, sends a resumption message to processor 119, and readies itself to receive the program material starting from I-frame$_{pause}$. This resumption message includes a resumption command, and the IP and/or MAC address of terminal 158-1. After reading the received resumption message, processor 119 retrieves the record associated with terminal 158-1 identified by the received IP and/or MAC address. In response to the resumption command, processor 119 causes the transmission of the program material to terminal 158-1 to be restarted from I-frame$_{pause}$, and notes in the record the transmission resumption event. As a result, terminal 158-1 resumes receiving the program material in the same program stream delivered thereto before. It should be noted that use of a MAC address, instead of an IP address, to identify terminal 158-1 may be advantageous here especially when the pause state is long, so much so that a reconfiguration of system 100 may have occurred during such a state. In that case, the IP address identifying terminal 158-1 before the system reconfiguration may be different than that after the reconfiguration, and as a result, by using only the pre-reconfiguration IP address of terminal 158-1 for its identification, the resuming program stream would not be delivered to the intended terminal 158-1 after the reconfiguration. On the other hand, since the MAC address of terminal 158-1 is immutable and survives any system reconfiguration, by relying on the MAC address of terminal 158-1 for its identification here, the resuming program stream would be correctly delivered to terminal 158-1 even after a system reconfiguration.

While viewing a program, the user may issue a rewind command, e.g., by pressing a rewind key on the remote control, to rewind the program. In that case, terminal 158-1 issues a rewind message to processor 119 identified by its IP address. This rewind message includes a rewind initiation command, the rewind speed specified by the user, the last I-frame identifier registered by terminal 158-1, and the IP address (and/or MAC address) identifying terminal 158-1. As mentioned before, the user here is afforded variable rewind speeds, in accordance with an aspect of the invention. For example, by pressing the rewind key on the remote control once, the user in this instance indicates to terminal 158-1 that the specified rewind speed is 2× the normal play speed; by pressing the rewind key on the remote control twice in quick succession, the specified rewind speed is the 3× speed; by pressing the rewind key on the remote control three times in quick succession, the specified rewind speed is the 6× speed; and by pressing the rewind key on the remote control four times in quick succession, the specified rewind speed is the 10× speed.

After processor 119 reads the received rewind message, processor 119 retrieves the record associated with set-top terminal 158-1 identified by the received IP address (and/or MAC address). Knowing from the record the identity of the program being transmitted, and based on the last I-frame identifier in the received rewind message, processor 119 determines whether the rewind command is issued by the user during a show segment (e.g., 231, 233, 235) or a commercial segment (e.g., 221, 227), as indicated at step 903 in FIG. 9.

Figure 9:
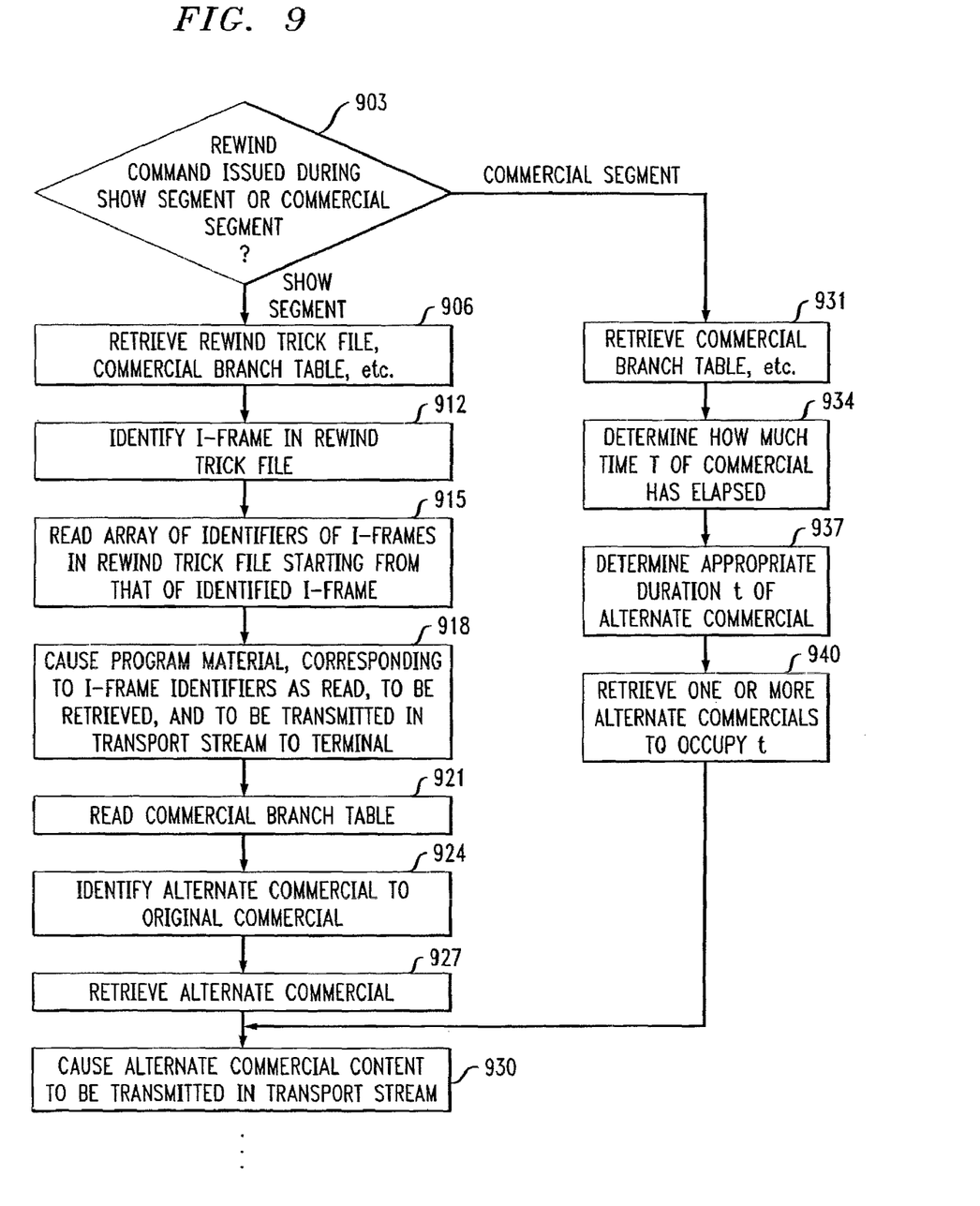
FIG. 9 is a flow chart depicting a process for rewinding a program in response to a rewind message from a set-top terminal.

In a first scenario where the rewind command is issued during a show segment, say, show segment 233, processor 119 at step 906 retrieves from the aforementioned asset storage a rewind trick file associated with show segment 233, followed by commercial branch table 300 associated with commercial 221*a*, a rewind trick file associated with show segment 231, etc. in that order, which is reverse to the order in which their associated assets were stored in the asset storage. The rewind trick files as retrieved correspond to the rewind speed specified in the received rewind message, say, the 2× speed in this instance. Based on the last I-frame information in the received message, processor 119 at step 912 identifies the I-frame in the rewind trick file associated with show segment 233, which either matches or is the closest to that last I-frame.

Processor 119 at step 915 reads the array of identifiers of the I-frames in the rewind trick file starting from that of the identified I-frame. Processor 119 at step 918 causes the program material, corresponding to the I-frame identifiers as read, to be retrieved from cache manager 111, and to be transmitted in the transport stream to terminal 158-1, thereby achieving the desired rewind effect. After reading the rewind trick file associated with show segment 233, processor 119 at step 921 reads commercial branch table 300. Processor 119 at step 924 identifies B4 representative of the alternate commercial to original commercial 221*a* at the 2× rewind speed. Processor 119 at step 927 retrieves the alternate commercial represented by B4 from Ad storage 126. Processor 119 at step 930 causes the alternate commercial content to be transmitted in the transport stream to terminal 158-1, thereby providing the user with the full impression of the alternate commercial, albeit 15 seconds long. After the transmission of the alternate commercial, processor 119 reads the rewind trick file associated with show segment 231 in a similar manner to reading the rewind trick file associated with show segment 233 described above; and so on and so forth.

In a second scenario where the rewind command is issued during a commercial segment, say, commercial segment 221, processor 119 at step 931 retrieves from the aforementioned asset storage a commercial branch table (300) associated with each commercial (221a) in commercial segment 221, followed by a rewind trick file associated with show segment 231, etc. The rewind trick file as retrieved corresponds to the rewind speed specified in the received rewind message, which is the 2× speed in this instance. Based on the last I-frame identifier specified in the received message, and the identifier of the beginning I frame of commercial 221a (e.g., $I_{1003}$) in table 300, processor 119 at step 934 determines how much time T of commercial 221a has elapsed before the user issues the rewind command, where $$T = (1 + \text{number of } I \text{ frames between beginning } I \text{ frame of commercial and last } I \text{ frame identified in received rewind message}) \times (I\text{-frame period}), \quad [1]$$

where the I-frame period is predetermined. Processor 119 at step 937 determines the appropriate duration t of the alternate commercial to be played, where $$t = T/(\text{relative rewind speed}). \quad [2]$$

For example, t=T/2 if the rewind speed is the 2× speed, which is the case in this instance; t=T/3 if the rewind speed is the 3× speed; t=T/6 if the rewind speed is the 6× speed; and t=T/10 if the rewind speed is the 10× speed. After determining t, processor 119 at step 940 retrieves one or more alternate commercials from Ad storage 126 to occupy t. Processor 119 proceeds from step 940 to above-described step 930 where it causes the retrieved alternate commercial content to be transmitted in the transport stream to terminal 158-1, By way of example, let=s say T=20 seconds. Accordingly, t=20/2=10 seconds in this instance. Knowing that it has a 10 second slot for one or more alternate commercials to fill, processor 119 identifies from table 300 B3 representative of an alternate commercial which is 10 seconds long. Processor 119 retrieves the alternate commercial represented by B3 from Ad storage 126. Processor 119 then causes the alternate commercial content to be transmitted in the transport stream to terminal 158-1, thereby providing the user with the full impression of the alternate commercial, albeit 10 seconds long.

In another example, let=s say T=16 seconds. Accordingly, t=16/2=8 seconds in this instance. Knowing that it has a 8 second time slot for one or more alternate commercials to fill, processor 119 identifies B2 representative the longest alternate commercial (i.e., 5 seconds long) in table 300 that can be fully displayed in that time slot (i.e., 8 seconds). Processor 119 first causes the alternate commercial content identified by B2 to be transmitted in the transport stream to terminal 158-1. For the remaining time in the time slot (i.e., 8−5=3 seconds), processor 119 in this instance causes transmission of a still image (e.g., a logo) representing the goods or service promoted to terminal 158-1 and a display thereof on the user=s TV screen for 3 seconds. Such a still image in this instance is identified as B1 in table 300.

After the transmission of the alternate commercial(s) to commercial 221a, processor 119 reads the rewind trick file associated with show segment 231 in a similar manner to reading the rewind trick file associated with show segment 233 described above; and so on and so forth.

When the user issues a command to stop rewinding the program, e.g., by pressing a stop key on the remote control, terminal 158-1 sends a rewind termination message to processor 119. This message includes a rewind termination command, and the IP address (and/or MAC address) of terminal 158-1.

In a first scenario where the rewind termination command is received during a show segment, processor 119 stops reading the rewind trick file associated with the show segment. Processor 119 learns from the record associated with terminal 158-1 the last I-frame identifier read from the rewind trick file. Processor 119 causes retrieval of the show program material at the normal forward speed from cache manager 111 starting from the I-frame identified by the last read identifier, and transmission of the retrieved show program material to terminal 158-1. As a result, terminal 158-1 resumes receiving the show program material at the normal forward speed in the same transport stream thereto.

In a second scenario where the rewind termination command is received during a display of an alternate commercial to, say, commercial 221a, processor 119 proceeds to finish playing the alternate commercial and in the meantime looks up from row 321 of table 300 the ending I-frame identifier (e.g., $I_{2501}$) of commercial 221a. Processor 119 causes retrieval of the show program material (or another commercial, if any) at the normal forward speed from cache manager 111 starting from the I-frame immediately following $I_{2501}$. As a result, terminal 158-1 resumes receiving the show program material (and any other commercials) at the normal forward speed in the same transport stream thereto.

After rewinding a program, the user may issue a fast-forward command, e.g., by pressing a fast-forward key on the remote control, to fast-forward the program. In that case, terminal 158-1 issues a fast-forward message to processor 119 identified by its IP address. This fast-forward message includes a fast-forward initiation command, the fast-forward speed specified by the user, the last I-frame identifier registered by terminal 158-1, and the IP address (and/or MAC address) identifying terminal 158-1. As mentioned before, the user here is afforded variable fast-forward speeds. For example, by pressing the fast-forward key on the remote control once, the user in this instance indicates to terminal 158-1 that the specified fast-forward speed is 2× the normal play speed; by pressing the fast-forward key on the remote control twice in quick succession, the specified fast-forward speed is the 3× speed; by pressing the fast-forward key on the remote control three times in quick succession, the specified fast-forward speed is the 6× speed; and by pressing the fast-forward key on the remote control four times in quick succession, the specified fast-forward speed is the 10× speed.

After processor 119 reads the received fast-forward message, processor 119 retrieves the record associated with set-top terminal 158-1 identified by the received IP address (and/or MAC address). Knowing from the record the identity of the program being transmitted, and based on the last I-frame identifier in the received fast-forward message, processor 119 determines whether the fast-forward command is issued by the user during a show segment (e.g., 231, 233, 235) or a commercial segment (e.g., 221, 227), as indicated at step 1003 in FIG. 10.

Figure 10:
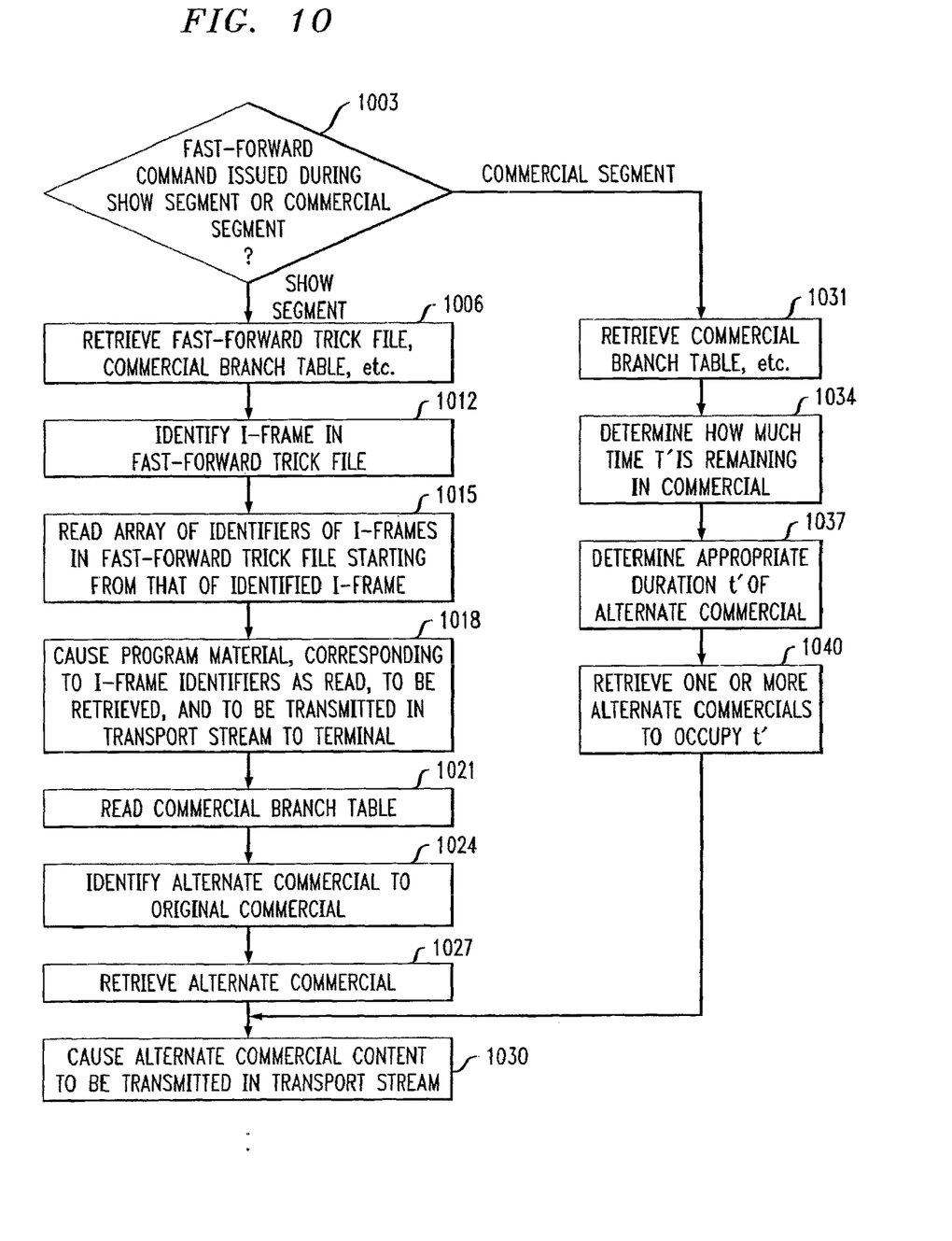
FIG. 10 is a flow chart depicting a process for fast-forwarding a program in response to a fast-forward message from a set-top terminal.

In a first scenario where the fast-forward command is issued during a show segment, say, show segment 231, processor 119 at step 1006 retrieves from the aforementioned asset storage a fast-forward trick file associated with show segment 231, followed by commercial branch table 300 associated with commercial 221a, a fast-forward trick file associated with show segment 233, etc. in that order, which is the same as the order in which their associated assets were stored in the asset storage. The fast-forward trick files as retrieved correspond to the fast-forward speed specified in the received fast-forward message, say, the 2× speed in this instance. Based on the last I-frame information in the received message, processor 119 at step 1012 identifies the I-frame in the fast-forward trick file associated with show segment 231, which either matches or is the closest to that last I-frame.

Processor 119 at step 1015 reads the array of identifiers of the I-frames in the fast-forward trick file starting from that of the identified I-frame. Processor 119 at step 1018 causes the show program material, corresponding to the I-frame identifiers as read, to be retrieved from cache manager 111, and to be transmitted in the transport stream to terminal 158-1, thereby achieving the desired fast-forward effect. After reading the fast-forward trick file associated with show segment 231, processor 119 at step 1021 reads commercial branch table 300. Processor 119 at step 1024 identifies A4 representative of alternate commercial to commercial 221a at the 2× fast-forward speed. Processor 119 at step 1027 retrieves the alternate commercial represented by A4 from Ad storage 126. Processor 119 at step 1030 causes the alternate commercial content to be transmitted in the transport stream to terminal 158-1, thereby providing the user with the full impression of the alternate commercial, albeit 15 seconds long. After the transmission of the alternate commercial, processor 119 reads the fast-forward trick file associated with show segment 233 in a similar manner to reading the rewind trick file associated with show segment 231 described above; and so on and so forth.

In a second scenario where the fast-forward command is issued during a commercial segment, say, commercial segment 221, processor 119 at step 1031 retrieves from the aforementioned asset storage a commercial branch table (300) associated with each commercial (221a) in commercial segment 221, followed by a fast-forward trick file associated with show segment 233, etc. The fast-forward trick file as retrieved corresponds to the fast-forward speed specified in the received fast-forward message, which is the 2× speed in this instance. Based on the last I-frame identifier specified in the received message, and the identifier of the ending I frame of commercial 221a (i.e., $I_{2501}$) in table 300, processor 119 at step 1034 determines how much time T=of commercial 221a is remaining when the user issues the fast-forward command, where $$T = (1 + \text{number of } I \text{ frames between last } I \text{ frame identified in received fast-forward message and ending } I \text{ frame of commercial}) \times (I\text{-frame period}), \quad [3]$$

where as mentioned before, the I-frame period is predetermined. Processor 119 at step 1037 determines the appropriate duration t=of the alternate commercials to be played, where $$t = T/(\text{relative fast-forward speed}). \quad [4]$$

For example, t=T/2 if the fast-forward speed is the 2× speed, which is the case in this instance; t=T/3 if the fast-forward speed is the 3× speed; t=T/6 if the fast-forward speed is the 6× speed; and t=T/10 if the fast-forward speed is the 10× speed. After determining t=, processor 119 at step 1040 retrieves one or more alternate commercials from Ad storage 126 to occupy t=. Processor 119 proceeds from step 1040 to above-described step 1030 where it causes the alternate commercial content to be transmitted in the transport stream to terminal 158-1.

By way of example, let=s say T==20 seconds. Accordingly, t==20/2=10 seconds in this instance. Knowing that it has a 10 second time slot for one or more alternate commercials to fill, processor 119 identifies from table 300 A3 representative of an alternate commercial which is 10 seconds long. Processor 119 retrieves the alternate commercial represented by A3 from Ad storage 126. Processor 119 then causes the alternate commercial content to be transmitted in the transport stream to terminal 158-1, thereby providing the user with the full impression of the alternate commercial, albeit 10 seconds long.

In another example, let=s say T==16 seconds. Accordingly, t==16/2=8 seconds in this instance. Knowing that it has a 8 second time slot for one or more alternate commercials to fill, processor 119 identifies A2 representative the longest alternate commercial (i.e., 5 seconds long) in table 300 that can be fully displayed in that time slot (i.e., 8 seconds). Processor 119 first causes the alternate commercial content identified by A2 to be transmitted in the transport stream to terminal 158-1. For the remaining time in the time slot (i.e., 8−5=3 seconds), processor 119 in this instance causes transmission of a still image (e.g., an MPEG still frame) of, for example, a logo representing the goods or service promoted to terminal 158-1 and a display thereof on the user=s TV screen for 3 seconds. Such a still image in this instance is identified as A1 in table 300.

After the transmission of the alternate commercial(s) to commercial 221a, processor 119 reads the fast-forward trick file associated with show segment 233 in a similar manner to reading the fast-forward trick file associated with show segment 231 described above; and so on and so forth.

When the user issues a command to stop fast-forwarding the program, e.g., by pressing a stop key on the remote control, terminal 158-1 sends a fast-forward termination message to processor 119. This message includes a fast-forward termination command, and the IP address (and/or MAC address) of terminal 158-1.

In a first scenario where the fast-forward termination command is received during a show segment, processor 119 stops reading the fast-forward trick file associated with the show segment. Processor 119 learns from the record associated with terminal 158-1 the last I-frame identifier read from the fast-forward trick file. Processor 119 causes retrieval of the show program material at the normal forward speed from cache manager 111 starting from the I-frame identified by the last read identifier, and transmission of the retrieved show program material to terminal 158-1. As a result, terminal 158-1 resumes receiving the show program material at the normal forward speed in the same transport stream thereto.

In a second scenario where the fast-forward termination command is received during a display of an alternate commercial to, say, commercial 221a, processor 119 proceeds to finish playing the alternate commercial and in the meantime looks up from row 321 of table 300 the ending I-frame identifier (e.g., $I_{2501}$) of commercial 221a. Processor 119 causes retrieval of the show program material (or another commercial, if any) at the normal forward speed from cache manager 111 starting from the I-frame immediately following $I_{2501}$. As a result, terminal 158-1 resumes receiving the show program material (and any other commercials) at the normal forward speed in the same transport stream thereto.

Figure 11:
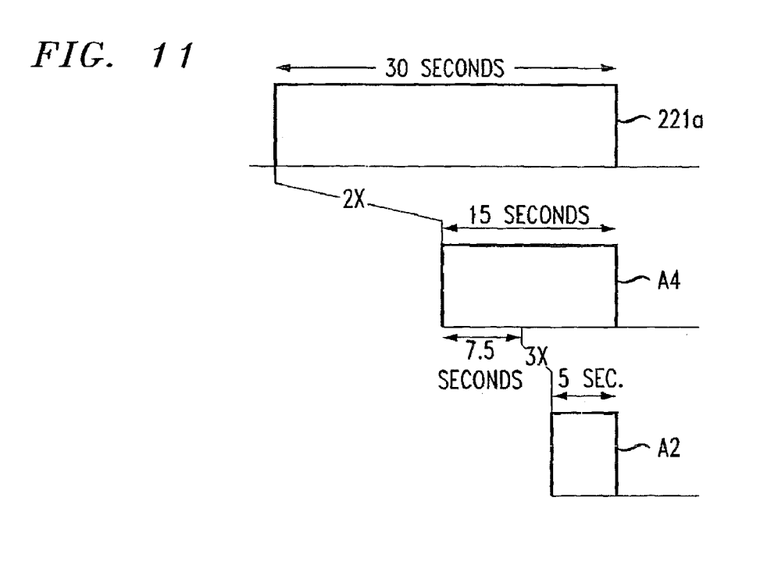
FIG. 11 illustrates application of alternate commercials to an original commercial, which vary with different fast-forward speeds in accordance with the invention.

It should be pointed out at this juncture that in the event that while a user is fast-forwarding (rewinding) a commercial, the user changes the fast-forward (rewind) speed, say, from a 2× speed to a 3× speed, the above-described alternate-commercial placement process similarly applies. FIG. 11 illustrates the available times for an alternate commercial varying with different fast-forward speeds. In FIG. 11, let=s say the user starts fast-forwarding commercial 221a, which is 30 seconds long, at the 2× fast-forward speed as soon as commercial 221a starts. In that case T==30, and t==30/2=15 seconds according to expression [4]. While the user is viewing alternate commercial A4 selected by processor 119, which is 15 seconds long, the user changes from the first 2× speed to the second 3× speed after, say, 7.5 seconds of alternate commercial A4 has been played. Thus, in this example, the remaining time in t=is 15−7.5=7.5 seconds. In response to the change in the speed, processor 119 in accordance with an aspect of the invention evaluates the available time τ=for a second alternate commercial replacing alternate commercial A4, where $$\tau = (\text{remaining time in } t=)/(\text{ratio of second speed to first speed}). \quad [5]$$

It can be shown that expression [4] is actually a corollary of expression [5]. In this instance, since the remaining time in t=is 7.5 seconds, and the ratio of the 3× speed to the 2× speed equals 3/2=1.5, τ==7.5/1.5=5 seconds according to [5]. As a result, processor 119 selects alternate commercial A2 replacing alternate commercial A4 to fill the new 5 second time slot.

Based on the disclosure heretofore, it is apparent to a person skilled in the art that the methodology whereby alternate commercials are selected varying with different rewind speeds similarly follows, whose description is thus omitted.

In an alternative embodiment, when a user chooses to fast-forward (rewind) programming content, e.g., TV show 200, at a high speed, e.g., the 10× speed, the application of such a high speed is limited only to its show segments, e.g., 231, 233 and 235, but not its commercial segments, e.g., 221 and 227. In this alternative embodiment, media processor 119 replaces each original commercial, e.g., 30 seconds long, in the commercial segments with an abbreviated alternate thereto having a predetermined duration, e.g., 15 seconds long, regardless of the actual fast-forward (rewind) speed selected by the user. That is, the user in this instance is forced to watch alternate commercial A4 (B4) corresponding to the 2× speed, as opposed to A1 (B1) corresponding to the 10× speed selected by the user as in the previous embodiment.

Figure 12:
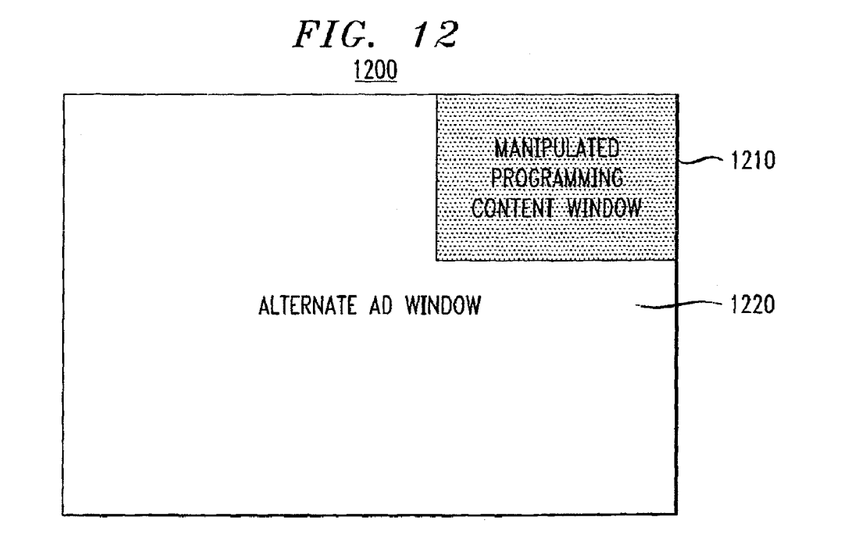
FIG. 12 illustrates a graphical user interface showing a commercial and manipulated programming content in accordance with an embodiment of the invention.

Typically, when a user chooses to manipulate (e.g., fast-forward, rewind, pause) programming content, like the original programming content, the manipulated programming content is shown occupying the entire display, e.g., TV screen. However, FIG. 12 illustrates graphical user interface (GUI) 1200, a display format by media processor 119 in accordance with an aspect of the invention which is applied when a user has issued a command to manipulate programming content. GUI 1200 illustrates the display of an alternate commercial, such as a banner advertisement that is accessed from, say, Ad storage 126, when a commercial is being manipulated. The alternate commercial is displayed on a relatively large portion of a TV screen—alternate ad window 1220—while the manipulated programming content is displayed on a relatively small portion of the TV screen—manipulated programming content window 1210. The manipulated programming content is provided in window 1210 at the rewind, fast-forward or other manipulation speed selected by the user. It should be noted that window 1210 may be located anywhere on GUI 1200 but, in a preferred embodiment, window 1210 is situated in a corner of GUI 1200 to increase the user's view of alternate ad window 1220.

Thus, for example, suppose a user has issued a command to fast-forward through a commercial at 2× the normal play speed. As illustrated by FIG. 12, the commercial would be displayed in window 1210 at 2× the normal play speed, and the other window 1220 would be dedicated to displaying an appropriate alternate commercial.

It should be noted that, in accordance with one embodiment of the invention, the multiple window arrangement illustrated in FIG. 12 is presented only when a commercial is manipulated. In another embodiment of the invention, the multiple window arrangement illustrated in FIG. 12 may be presented to a user during manipulation of any programming content, as opposed to only instances when commercials are manipulated. In such instances, the manipulated programming content may be displayed in window 1210 and alternate advertisement content, programming manipulation description (e.g., "program being rewound"), or some other informational/entertainment content (e.g., weather information, sports scores) may be displayed in window 1220. In yet another embodiment, when a command to manipulate programming content is received, the display switches between the multiple window arrangement of FIG. 12 when commercials are manipulated and the typical simple window screen when programming content, other than a commercial, is manipulated.

Local Storage of Alternate Commercials

Figure 13:
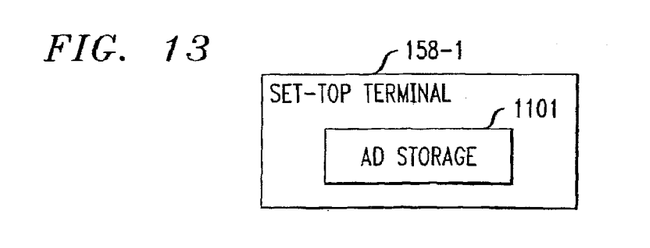
FIG. 13 illustrates a set-top terminal incorporating storage of commercial content in an embodiment of the invention.

In the above illustrative embodiment, alternate commercial content is stored in Ad storage 126 in headend 105. However, in a second embodiment, the alternate commercial content is stored locally to set-top terminals, instead. For example, it may be stored in advertisement storage in a neighborhood or a household accessible by the set-top terminals in the same neighborhood or household. The advertisement storage may be connected to the terminals or incorporated in ones of the terminals. FIG. 13 illustrates one such advertisement (Ad) storage, denoted 1101, incorporated in a set-top terminal, say terminal 158-1. Terminal 158-1 may be connected to other set-top terminals in the same household in a master-slave configuration, where terminal 158-1 (master) serves the other terminals (slaves) with alternative commercials from its storage 1101 at the request of the slave terminals.

In this second embodiment, the program stream transmitted to terminal 158-1 after the user at the terminal issues a rewind or fast-forward command does not contain alternate commercial content itself. Rather, it contains play list messages concerning alternate commercials, based on which terminal 158-1 locally inserts into the program stream the appropriate alternate commercials from Ad storage 1101. However, in both cases the user perceives the same rewind or fast-forward effect as described above, with alternate commercials substituting the original commercials. For example, a play list message may be generated by media processor 119, and transmitted in the program stream in advance of an alternate commercial to be inserted by a predetermined period. The play list message may specify the appropriate alternate commercial to be inserted by its code. This alternate commercial may be identified by media processor 119 in a manner described before.

Thus, after receiving one such play list message, terminal 158-1 relies on a clock (not shown) to keep track of time elapsed from the receipt of the message, retrieves from Ad storage 1101 the content of the alternate commercial identified by its code in the message, and inserts the alternate commercial content in the received program stream as soon as the predetermined period from the receipt of the message expires. It should be noted that the alternate commercials in storage 1101 may be updated by headend 105, which may from time to time transmit the updated commercial content via an out-of-band channel, e.g., FDC, to terminal 158-1, without interrupting any program stream received by terminal 158-1 through an in-band channel.

The arrangement in this second embodiment is particularly advantageous to inserting commercials into a program stream which are targeted to the user at a set-top terminal. For example, Ad storage 1101 stores commercial content targeted to the user at terminal 158-1. The stored commercial content may be based on (a) the user=s personal information, e.g., his/her address, gender, education level, profession, etc., which may be obtained from the user when he/she registered with the cable service; and/or (b) the user=s program viewing behavior/habit, e.g., the type of program channel to which the user tunes, the type of programming content being viewed, the time of day that the programming content is viewed, etc.

Thus, in this example, the play list message received by terminal 158-1 does not identify the alternate commercial to be inserted. Rather, the message specifies the appropriate duration of such an alternate commercial. Knowing such duration information, and the rewind or fast-forward mode it is in, terminal 158-1 selects from storage 1101 a targeted alternate commercial(s) of the appropriate duration and content. For example, the targeted commercial content may relate to the programming content being viewed by the user. Let=s say the programming content being viewed is a sporting event, e.g., a NFL football game, the targeted commercial content selected from storage 1101 relates to sportswear, sneakers, exercise equipment, etc. which suits the user=s age, gender and other criteria.

In accordance with another aspect of the invention, ones of the alternate commercials in Ad storage 1101 may also be selected to play on the TV screen while terminal 158-1 is in a pause mode triggered by the user=s issuing a pause command to pause the programming content being viewed. For example, one such alternate commercial may comprise a still image or series of images promoting the goods or service targeted to the user, which is displayed in lieu of the paused (or frozen) programming image.

Based on the disclosure heretofore, it is apparent to a person skilled in the art that the above-described interactivities between a set-top terminal and media processor 119 and/or network controller 125 in serving a TV broadcast program similarly apply to serving other types of asset including, e.g., a commercial or other advertising content, music video, news event, weather report, traffic report, sports event, video-on-demand (VOD), an audio-on-demand, etc.

The foregoing merely illustrates the principles of the invention. It will thus be appreciated that those skilled in the art will be able to devise numerous other arrangements which embody the principles of the invention and are thus within its spirit and scope.

For example, the PVR-like functions (e.g., pausing, fast-forwarding and rewinding) described above are conducive to an enhanced program enjoyment, especially where an interactive commercial (say, commercial 221*a* in FIG. 3) is encountered in a program (say, TV program 200). In prior art, if a user chooses to select an interactive option in such a commercial to obtain additional information, e.g., the specification of a particular product being advertised, the user is typically shown additional commercial displays which often results in prolonging the commercial at the expense of the in-progress show segment following the commercial, say, show segment 233. That is, in prior art, after the user finishes viewing the prolonged interactive commercial which exceeds its normal time allotment, the user often is returned to the midst of the in-progress show segment, thereby undesirably missing a beginning portion of the show segment.

Thus, to enhance the user's program enjoyment in case of a prolonged interactive commercial, in accordance with another aspect of the invention, the beginning of the show segment following the commercial is "paused" to wait for the user's return. To that end, digital cue message 241 provides to play list manager 124 in advance such information as commercial 221*a* being an interactive commercial. In response, manager 124 stores in a buffer the identifier of the last I-frame of commercial segment 221 also from message 241. In the event that media processor 119 is informed of a user selection of an interactive option in commercial 221*a*, processor 119 causes the necessary additional commercial displays (e.g., stored in Ad storage 126) associated with commercial 221*a* to be provided to the user. In this instance the resulting interactive commercial exceeds the time allotment of commercial segment 221. Processor 119 requests from manager 124 the identifier of the last I-frame of commercial segment 221. As soon as processor 119 finishes providing the necessary additional commercial displays, processor 119 retrieves from cache manager 111*a* copy of the program stream containing program 200 starting from the I-frame which immediately follows the last I-frame of commercial segment 221 identified, and which corresponds to the beginning of show segment 233. Processor 119 then provides the copy of the program stream to the user, without depriving the user of any beginning portion of segment 233 as in prior art.

Moreover, in the disclosed embodiment, the transport streams generated by processor 109, which contain, e.g., live TV broadcast, are recorded in cache manager 111, followed by library manager 113, before they are fed to the requesting set-top terminals. As a result, the transport streams received by the terminals actually are recorded copies of the streams generated by processor 109. However, in another embodiment, the transport streams generated by processor 109 are fed to the requesting set-top terminals in real time, and at the same time switched to cache manager 111 and library manager 113 for recording thereof. Thus, in this second embodiment, when a user at a set-top terminal performs a PVR-like function on an in-progress TV broadcast program, say, rewinding the program, the real-time transport stream being received by the terminal is immediately replaced by a second transport stream containing a recorded copy of the TV program, e.g., from cache manager 111. If after rewinding the program, the user invokes a fast-forwarding command to fast-forward the recorded TV program, there may come a point where the recorded TV program catches up with the in-progress program. In that case, the second transport stream being received by the terminal may be replaced back by the real-time transport stream containing the in-progress program.

In addition, in the disclosed embodiment, the network transport is illustratively realized using HFC cable network 140. However, other networks such as digital subscriber line (DSL) networks, ethernet networks and satellite networks may be used instead.

Further, in the disclosed embodiment, delimiting messages are used to identify demarcations of different programs and program segments within each program. In accordance with another embodiment, such demarcations may be specified by schedule data from a storage device or server in communication with A/S processor 109. Such data may be received from, for example, an electronic program guide (EPG) server or third party scheduler.

Moreover, in the disclosed embodiment, for each alternate commercial, a fast-forward version (e.g., A1, A2, A3 and A4) and a rewind version (e.g., B1, B2, B3, B4) are provided, as illustrated in table 300. However, it will be appreciated that a person skilled in the art may be able to manipulate only one of the two versions to realize the alternate commercial in both fast-forward and rewind directions.

In addition, in the disclosed embodiment, I-frames are used as positional markers in programming content. To more finely define positions in the programming content, one may rely on P-frames or B-frames which occur more frequently than the I-frames in a program stream.

Finally, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for presenting programming content including a commercial segment therein, said commercial segment including a plurality of commercials, comprising:
   generating for each of the plurality of commercials in said commercial segment, a commercial branch table;
   receiving a request for manipulation of a presentation of the programming content, the request including information concerning a manipulation speed affecting the presentation; and
   selecting, in response to the request, based on information stored in a first commercial branch table including information identifying alternate commercials which may be presented instead of a first commercial in said commercial segment, an alternate commercial for presentation, in lieu of the first commercial, as a function of the manipulation speed, said first commercial branch table being one of said plurality of commercial branch tables.

2. The method of claim 1, wherein the manipulation includes rewinding the programming content in presentation thereof, said table including information identifying different commercials to be selected in response to fast forward and rewind, said selecting including selecting a commercial corresponding to rewind.

3. The method of claim 2, wherein said table includes information identifying multiple commercials, a different commercial being identified for at least three different rewind speeds of operation.

4. The method of claim 1, wherein the manipulation includes pausing the programming content in presentation thereof.

5. The method of claim 1, wherein the request is made during a presentation of the commercial.

6. The method of claim 5, wherein the manipulation includes changing a speed of fast-forwarding the commercial in presentation thereof.

7. The method of claim 5, wherein the manipulation includes changing a speed of rewinding the commercial in presentation thereof.

8. The method of claim 1, wherein the commercial is related to the selected alternate commercial.

9. The method of claim 8, wherein the commercial and the selected alternate commercial promote the same goods or service.

10. The method of claim 1, wherein the commercial is unrelated to the selected alternate commercial.

11. A method for presenting programming content including a commercial segment therein, comprising:
    prior to receiving a request for manipulation of a presentation of said programming content, detecting a digital cue message included in said programming content in advance of said commercial segment;
    generating, in response to said digital cue message, at least a first commercial branch table;
    receiving said request for manipulation of a presentation of the programming content, the request including information concerning a manipulation speed affecting the presentation; and
    selecting, in response to the request, based on information stored in a commercial branch table including information identifying alternate commercials which may be presented instead of a first commercial in said commercial segment, an alternate commercial for presentation, in lieu of the first commercial, as a function of the manipulation speed.

12. The method of claim 11, where said digital cue message is included in said programming content at a predetermined time in advance of said first commercial in said commercial segment.

13. The method of claim 12, wherein said predetermined time is a predetermined number of seconds.

14. The method of claim 11, wherein said commercial branch table includes information identifying a different commercial for each of a plurality of different fast forward speeds and a different commercial for each of a plurality of different of reverse speeds.

15. The method of claim 14, wherein said different fast forward speeds includes more than 2 fast forward speeds.

* * * * *